US011620595B2

(12) United States Patent
Gao et al.

(10) Patent No.: US 11,620,595 B2
(45) Date of Patent: Apr. 4, 2023

(54) DEEP REINFORCEMENT LEARNING FOR LONG TERM REWARDS IN AN ONLINE CONNECTION NETWORK

(71) Applicant: Microsoft Technology Licensing, LLC, Redmond, WA (US)

(72) Inventors: Siyuan Gao, Hamden, CT (US); Yiou Xiao, Sunnyvale, CA (US); Parag Agrawal, Mountain View, CA (US); Aastha Jain, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 203 days.

(21) Appl. No.: 16/743,486

(22) Filed: Jan. 15, 2020

(65) Prior Publication Data
US 2021/0216944 A1 Jul. 15, 2021

(51) Int. Cl.
| | |
|---|---|
| *G06Q 10/06* | (2012.01) |
| *G06N 20/00* | (2019.01) |
| *G06Q 50/00* | (2012.01) |
| *H04L 67/50* | (2022.01) |
| *G06Q 10/0631* | (2023.01) |

(52) U.S. Cl.
CPC ..... *G06Q 10/063112* (2013.01); *G06N 20/00* (2019.01); *G06Q 50/01* (2013.01); *H04L 67/535* (2022.05)

(58) Field of Classification Search
None
See application file for complete search history.

(56) References Cited

U.S. PATENT DOCUMENTS

| | | | |
|---|---|---|---|
| 2016/0026918 A1* | 1/2016 | Barbieri | G06Q 30/0631 706/11 |
| 2016/0255139 A1* | 9/2016 | Rathod | H04L 51/046 709/203 |
| 2018/0115603 A1* | 4/2018 | Hu | G06F 16/24578 |
| 2019/0114687 A1* | 4/2019 | Krishnamurthy | G06F 16/9535 |
| 2020/0241878 A1* | 7/2020 | Chandak | G06N 3/006 |

OTHER PUBLICATIONS

Siswanto et al., Simple Vector Representations of E-Commerce Products, Date of Conference: Nov. 15-17, 2018, IEEE (Year: 2018).*

(Continued)

*Primary Examiner* — Chesiree A Walton
(74) *Attorney, Agent, or Firm* — Schwegman, Lundberg & Woessner, P.A.

(57) ABSTRACT

An online connection server is configured to more accurately predict connections for a viewing member of an online connection network. The online connection server may implement a machine-learning model that uses prior interactions by the viewing member to determine those connections that are likely to lead to more substantial interactions with the viewing member. The machine-learning model may be implemented using a reinforcement learning technique, such as a Deep Q network. The online connection server may further implement a state representation module that generates a state from a graph-based embedding of the viewing member profile, where the state is used to train the machine-learning model and determine an optimal candidate to recommend as a connection for the viewing member.

20 Claims, 9 Drawing Sheets

(56) References Cited

OTHER PUBLICATIONS

Pi et al., Structural Bregman Distance Functions Learning to Rank with Self-Reinforcement, Date of Conference: Dec. 14-17, 2014, IEEE (Year: 2014).*

Liu et al, Deep Reinforcement Learning based Recommendation with Explicit User-Item Interactions Modeling; Oct. 29, 2019; arXiv: 1810.12027v3 (Year: 2019).*

* cited by examiner

DEEP REINFORCEMENT LEARNING FOR LONG TERM REWARDS IN AN ONLINE CONNECTION NETWORK

TECHNICAL FIELD

The subject matter disclosed herein generally relates to systems and methods for implementing a machine-learning model that improves suggested connections to members of an online connection network and, in particular, to a deep Q-learning method that leverages prior interactions with previously suggested connections to determine which currently suggested connections that are likely to lead to higher or better rewards.

BACKGROUND

An online connection network typically encourages members of the online connection network to establish connections (e.g., relationships) between each other. In doing so, an online connection system may recommend other members of the online connection network as suggested connections. However, accurately choosing which members of the online connection network is a challenging problem. Selecting which of the members to recommend is challenging due to the dynamic nature of the online connection network and fluctuations in member preferences. For example, a viewing member may add or remove one or more of his or her member preferences, which may affect which other members of the online connection network are selected as potential connections for the viewing member. Furthermore, as members are added to and/or leave the online connection network, the pool from which members are selected as recommended connections also changes.

In addition, recommending connections to a viewing member presents several other challenges. One such challenge is that the suggested connection may be based on a limited set of data or focused on a short-term reward. In some instances, the online connection system may determine a suggested connection on a short-term reward value, such as a click-through rate, rather than on a long-term reward value, such as a number of potential communications. Another challenge is that the online connection system may be focused on a limited set of member feedback. Such feedback may include whether a viewing member selected (e.g., "clicked") or passed over (e.g., "no clicked") a particular suggested connection. Furthermore, the online connection network may not include a viewing member's behavior relative to the suggested connection after the viewing member has opted to connect with the suggested connection.

BRIEF DESCRIPTION OF THE DRAWINGS

Some embodiments are illustrated by way of example and not limitation in the figures of the accompanying drawings.

DETAILED DESCRIPTION

Overview

Figure 1:
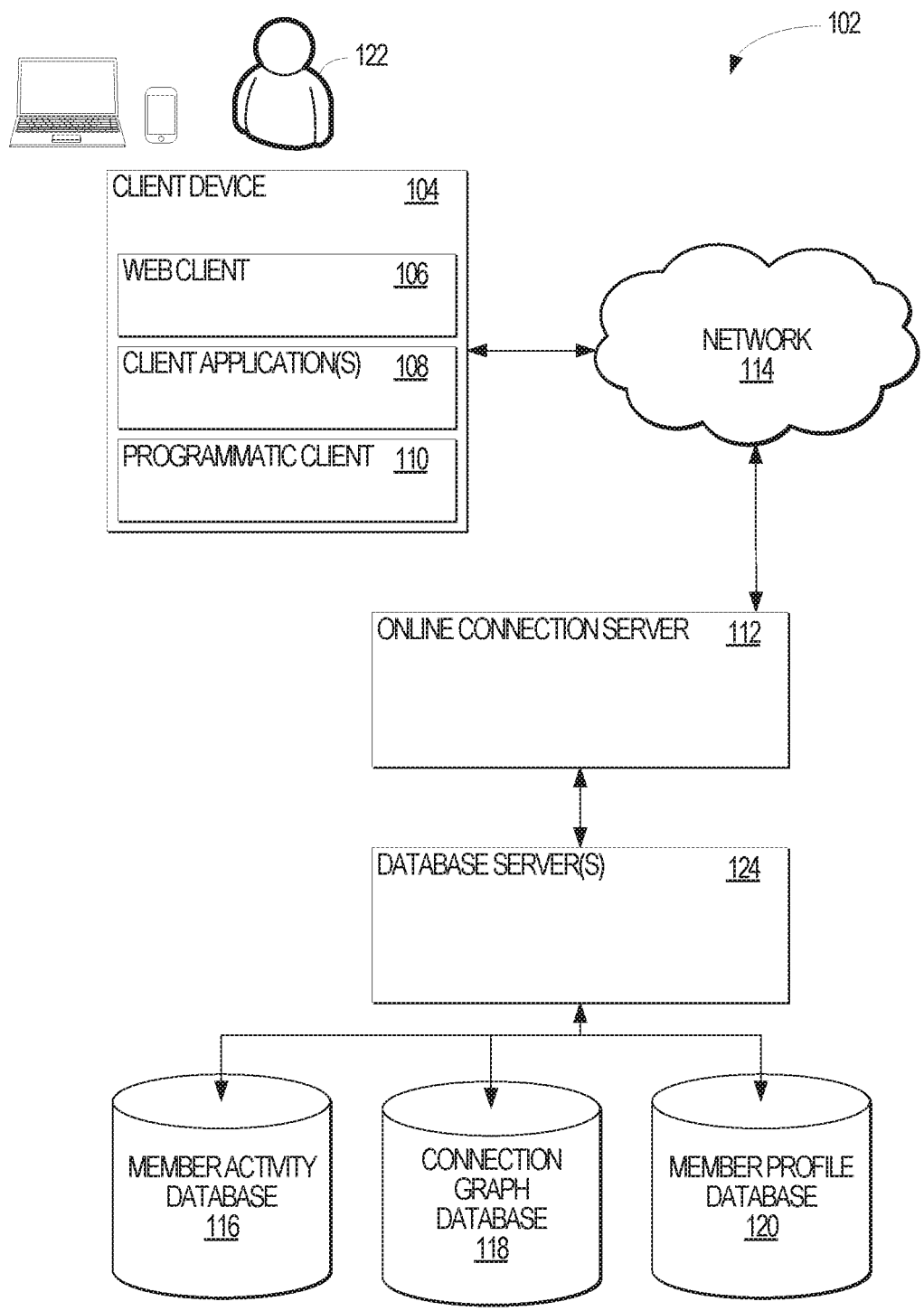
FIG. 1 is a block diagram illustrating a networked system, according to some example embodiments.

Example methods and systems are directed to using a state-based sequential algorithm with a deep Q-learning machine-learning model to improve the accuracy of suggested connections for members of an online connection network. The disclosed systems and methods also incorporate implicit or passive member feedback to improve the accuracy of the suggested connections. Examples of implicit or passive member feedback include the number of conversations conducted between two members, the number of visits to the online connection system, the types of interactions conducted between two members, and other such implicit or passive member feedback.

To address these and other these challenges, this disclosure describes a deep, reinforcement-based recommendation framework, which models future (e.g., long-term) reward explicitly. In this context, a "reward" may include one or more types of interactions between a viewing member and a recommended connection for the user. Furthermore, a distinction is made between a short-term reward and a long-term reward. A short-term reward may be an interaction between a viewing member and a recommended connection that occurs within a predetermined time period after the connection is recommended, such as 28 days. A long-term reward may be an interaction between a viewing member and a recommended connection that occurs after a predetermined time period after the connection is recommended, such as six months. Thus, a short-term reward may be those interactions that occur within 28 days of a recommendation, and a long-term reward may be those interactions that occur six months after the recommendation. The time periods for the short-term reward and/or the long-term reward may be configurable and could be assigned different values.

Reinforcement learning has shown its advantage in tasks that require a machine-learning model to interact with an environment and maximize a long-term reward achieved during a predetermined time period. By modeling a long-term reward as a Q-function and utilizing temporal-difference (TD) learning, a deep neural network-based function approximator estimates a (state, action) pair's quality. TD-learning is a specific learning strategy that is based on the Bellman equation. In general, TD-learning combines a Monte-Carlo method and dynamic programming. In one embodiment, the disclosed systems and methods employ a one-step TD-error as an objective function to minimize, and this approach facilitates training of a machine-learning model in an off-policy way as the Bellman equation should be satisfied for one or more state transitions. As discussed below with reference to FIG. 3, the disclosed systems and methods may use a replay buffer that stores a predetermined number of off-policy state transitions and, in each optimization step, the disclosed systems and methods sample a predetermined number of transitions to optimize the parameters of the described neural network.

The solutions and approaches described herein address a unique problem that arises within an online connection network, particularly one where the membership and member preferences change frequently. In this type of environment, attempting to predict potential connections that will have a long-term reward is challenging as there are constant changes to the online connection network. Thus, the disclosed systems and methods improve the accuracy and relevancy of the recommended connections. Such improvements have non-trivial benefits to data scientists and engineers, as such improvements can translate to other technologies that may benefit from more accurate predictions, such as a weather forecasting, speech recognition, document translation, automotive navigation, and other such technologies where a more accurate prediction leads to a higher reward (e.g., a better solution).

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

DETAILED EMBODIMENT

With reference to FIG. 1, an example embodiment of a high-level client-server-based network architecture 102 is shown. An online connection server 112 provides server-side functionality via a network 124 (e.g., the Internet or wide area network (WAN)) to one or more client devices 104. FIG. 1 illustrates, for example, a web client 106 (e.g., a browser, such as the Internet Explorers browser developed by Microsoft Corporation of Redmond, Wash. State), an application 108, and a programmatic client 110 executing on client device 104. The online connection server 112 is further communicatively coupled with one or more database servers 124 that provide access to one or more databases 116-120.

The client device 104 may include, but is not limited to, a mobile phone, desktop computer, laptop, portable digital assistants (PDAs), smart phones, tablets, ultra books, netbooks, laptops, multi-processor systems, microprocessor-based or programmable consumer electronics, or any other communication device that a user 122 may utilize to access the online connection server 112. In some embodiments, the client device 104 may comprise a display module (not shown) to display information (e.g., in the form of user interfaces). In further embodiments, the client device 104 may comprise one or more of a touch screens, accelerometers, gyroscopes, cameras, microphones, global positioning system (GPS) devices, and so forth. The client device 104 may be a device of a user 122 that is used to perform one or more searches for user profiles accessible to, or maintained by, the online connection server 112.

In one embodiment, the online connection server 112 is a network-based appliance that responds to initialization requests or search queries from the client device 104. One or more users 122 may be a person, a machine, or other means of interacting with client device 104. In various embodiments, the user 122 is not part of the network architecture 102, but may interact with the network architecture 102 via the client device 104 or another means. For example, one or more portions of network 114 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, an online connection network access client, and the like. In some embodiments, if the online connection network access client is included in the client device 104, then this application is configured to locally provide the user interface and at least some of the functionalities with the application configured to communicate with the online connection server 112, on an as needed basis, for data and/or processing capabilities not locally available (e.g., access to a member profile, to authenticate a user 122, to identify or locate other connected members, etc.). Conversely if the online connection server access client is not included in the client device 104, the client device 104 may use its web browser to access the initialization and/or search functionalities of the online connection server 112.

One or more users 122 may be a person, a machine, or other means of interacting with the client device 104. In example embodiments, the user 122 is not part of the network architecture 102, but may interact with the network architecture 102 via the client device 104 or other means. For instance, the user 122 provides input (e.g., touch screen input or alphanumeric input) to the client device 104 and the input is communicated to the networked system 102 via the network 114. In this instance, the online connection server 112, in response to receiving the input from the user 122, communicates information to the client device 104 via the network 114 to be presented to the user 122. In this way, the user 122 can interact with the online connection server 112 using the client device 104.

Further, while the client-server-based network architecture 102 shown in FIG. 1 employs a client-server architecture, the present subject matter is of course not limited to such an architecture, and could equally well find application in a distributed, or peer-to-peer, architecture system, for example.

In addition to the client device 104, the online connection server 112 communicates with other one or more database server(s) 124 and/or database(s) 116-122. In one embodiment, the online connection server 112 is communicatively coupled to a member activity database 116, a connection graph database 118, and a member profile database 120. The databases 116-120 may be implemented as one or more types of databases including, but not limited to, a hierarchical database, a relational database, an object-oriented database, a graph database, one or more flat files, or combinations thereof. Examples of graph databases include, but are not limited to, Neo4j, which is available from Neo Technology, Inc., Giraph, which is available from The Apache Software Foundation, and GraphLab, which is available from Dato, Inc.

The member profile database 120 stores member profile information about members who have registered with the online connection server 112. Consistent with some embodiments, when a person initially registers to become a member of the online connection service provided by the online connection server 112, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the member profile database 120. Similarly, when a representative of an organization initially registers the organization with the online connection service provided by the online connection server 112, the representative may be prompted to provide certain information about the organization. This information may be stored, for example, in the member profile database 120. With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Members of the online connection service provided by the online connection server 112 may establish connections with one or more members and/or organizations of the online connection service. The connections may be defined as a connection graph, where the member and/or organization is represented by a node in the connection graph and the edges identify connections between nodes. In this regard, the edges may be bilateral (e.g., two members and/or organizations have agreed to form a connection), unilateral (e.g., one member has agreed to form a connection with another member), or combinations thereof. In this manner, members are said to be first-degree connections where a single edge connects the nodes representing the members; otherwise, members are said to be "nth"-degree connections where "n" is defined as the number of edges separating two nodes. As an example, two members are said to be "2nd-degree" connections where each of the members share a connection in common, but are not directly connected to one another. In one embodiment, the connection graph maintained by the online connection server 112 is stored in the connection graph database 118.

Although the foregoing discussion refers to "connection graph" in the singular, the connection graph database 118 may be configured to store multiple connection graphs. For example, and without limitation, the online connection server 112 may maintain multiple connection graphs, where each connection graph corresponds to various geographic regions, industries, members, or combinations thereof. As discussed below, in generating the various indices, the online connection server 112 may be configured to generate a single graph or multiple graphs.

As members interact with the online connection service provided by the online connection server 112, the online connection server 112 is configured to log these interactions. Examples of interactions include, but are not limited to, commenting on content posted by other members, viewing member profiles, editing or viewing a member's own profile, sharing content outside of the online connection service (e.g., an article provided by an entity other than the online connection server 112), updating a current status, posting content for other members to view and/or comment on, and other such interactions. In one embodiment, these interactions are stored in a member activity database 116, which associates interactions made by a member with his or her member profile stored in the member profile database 120. The member activity database 116 may also include information about prior interactions between other members of the online connection network, such as whether a given member invited to connect with another member, whether a given member communicated with another member, the number of prior communications between members, and/or the time periods associated with the various interactions. For example, the member activity database 116 may log a timestamp with each of the interactions so that the online connection server 112 can determine when a given member last interacted with another member of the online connection network.

The member profile database 120 may also store information about recommended connections for members of the online connection network. In one embodiment, the online connection server 112 is configured to determine an initial set of recommended connections for a given member of the online connection network. The initial set of recommended connections may be determined as described in U.S. patent application Ser. No. 15/063,807, titled "CHARACTERIZING AND MANAGING SOCIAL NETWORK INTERACTIONS" and filed Mar. 8, 2016, the disclosure of which is hereby incorporated by reference in its entirety. The initial set of recommended connections may be based on one or more member profile attributes including, but not limited to, educational history, employment history, skills, types of content previously viewed, common connections (e.g., whether the given member and the recommended connections have mutual connections), and other such member profile attributes or combinations thereof.

In one embodiment, the online connection server 112 communicates with the various databases 116-122 through one or more database server(s) 124. In this regard, the database server(s) 124 provide one or more interfaces and/or services for providing content to, modifying content, removing content from, or otherwise interacting with the databases 116-122. For example, and without limitation, such interfaces and/or services may include one or more Application Programming Interfaces (APIs), one or more services provided via a Service-Oriented Architecture ("SOA"), one or more services provided via a REST-Oriented Architecture ("ROA"), or combinations thereof. In an alternative embodiment, the online connection server 112 communicates with the databases 116-122 and includes a database client, engine, and/or module, for providing data to, modifying data stored within, and/or retrieving data from, the one or more databases 116-122.

The database server(s) 124 may include one or more different types of servers. For example, the database server(s) 124 may include a Microsoft® Exchange Server, a Microsoft® Sharepoint® Server, a Lightweight Directory Access Protocol ("LDAP") server, any other server configured to provide user profile information, or combinations thereof. Accordingly, and in one embodiment, the servers in communication with the online connection server 112 are configured to access the various databases 116-122 and retrieve or store corresponding information.

Figure 2:
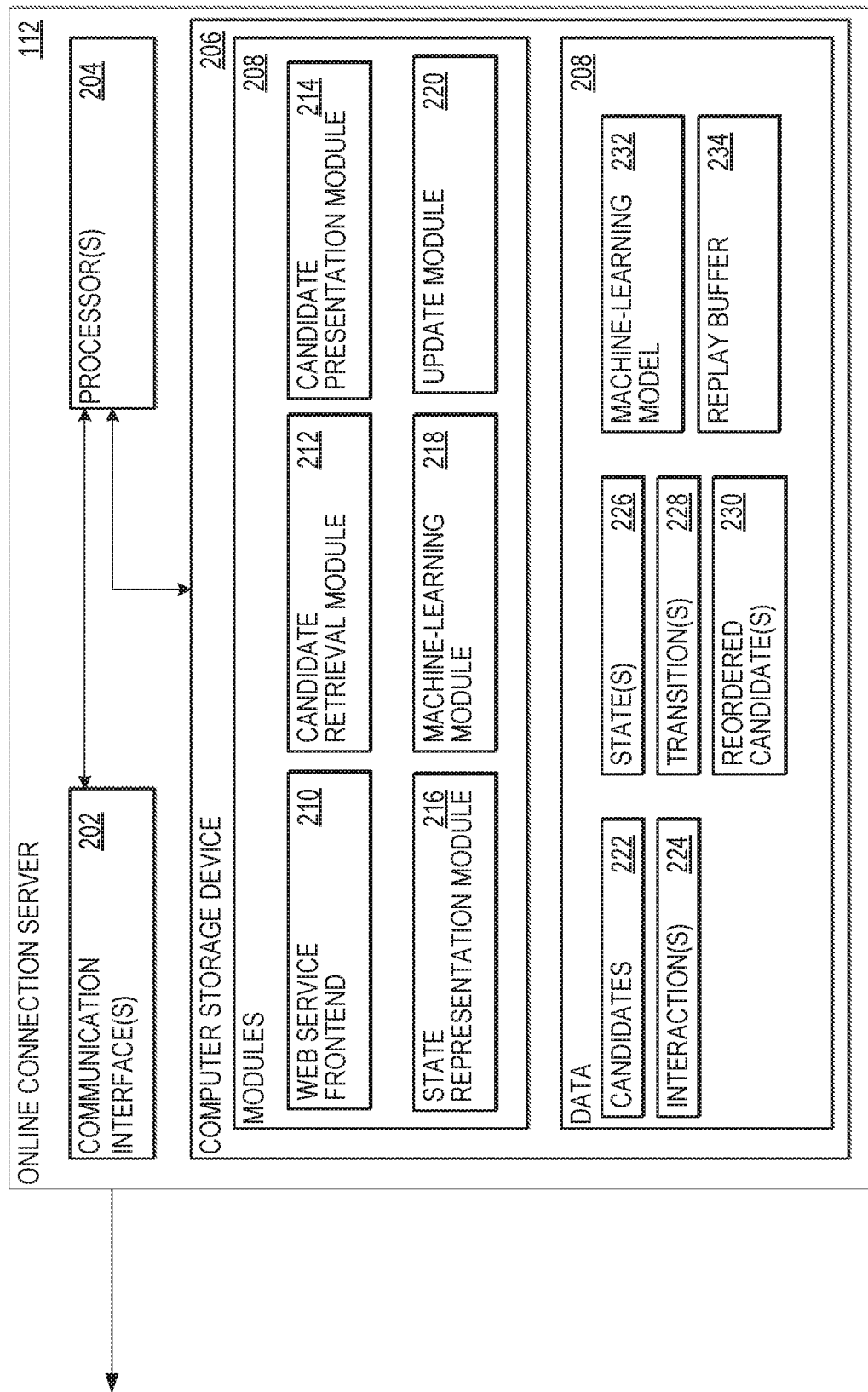
FIG. 2 illustrates the online connection server of FIG. 1, according to an example embodiment.

FIG. 2 illustrates the online connection server 112 of FIG. 1 in accordance with an example embodiment. In one embodiment, the online connection server 112 includes one or more processor(s) 204, one or more communication interface(s) 202, and a computer storage device 206 that stores computer-executable instructions for one or more modules(s) 208 and data 210 used to support one or more functionalities of the modules 208.

The various functional components of the online connection server 112 may reside on a single device or may be distributed across several computers in various arrangements. The various components of the online connection server 112 may, furthermore, access one or more databases (e.g., databases 116-120 or any of data 210), and each of the various components of the online connection server 112 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Further still, the one or more processors 204 may include one or more special-purpose processors, such as a Field-Programmable Gate Array (FPGA) or an Application Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications between the online connection server 112, the client device 104, and one or more of the database server(s) 124 and/or database(s) 116-122. The one or more communication interfaces 202 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combination of such wired and wireless interfaces.

The computer storage device 206 includes various modules 208 and data 210 for implementing the online connection server 112. The computer storage device 206 includes one or more devices configured to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the modules 208 and the data 210. Accordingly, the computer storage device 206 may be implemented as a single storage apparatus or device, or, alternatively and/or additionally, as a "cloud-based" storage systems or storage networks that include multiple storage apparatus or devices. As shown in FIG. 2, the computer storage device 206 excludes signals per se.

In one embodiment, the modules 208 are written in a computer-programming and/or scripting language. Examples of such languages include, but are not limited to, C, C++, C#, Java, JavaScript, Perl, Python, or any other computer programming and/or scripting language now known or later developed.

With reference to FIG. 2, the modules 208 of the online connection server 112 include, but are not limited to, a web service frontend module 212, a candidate retrieval module 212, a candidate presentation module 214, a state representation module 216, a machine-learning module 218, and an update module 220. As used herein, a candidate may include a member profile selected from the member profile database 120. Additionally, and/or alternatively, a candidate may be a recommended connection (e.g., a recommended member profile selected from the member profile database 120), where the recommended connection was previously determined for the user 122.

The data 210 supporting these modules 208 include, but is not limited to, one or more candidates(s) 222, one or more interaction(s) between the member profile of the user 122 and the one or more candidate(s) 222, one or more state(s) 226, one or more transitions(s) 228, reordered candidate(s) 230, a machine-learning model 232, and a replay buffer 234 configured to store a predetermined number of the transitions(s) 228.

The web service frontend module 212 is configured to provide access to, and interactions with, the online connection server 112. In one embodiment, the web service frontend module 210 provides one or more graphical user interfaces, which may be provided using the Hypertext Transfer Protocol (HTTP). The graphical user interfaces are displayable by the client device 104 and accept input from the user 122 for interacting with the online connection server 112. Further still the web service frontend 210 may be configured to provide such interfaces to one or more clients displayable by the client device 104, such as the web client 106, one or more client applications 108, or the programmatic client 110. By interacting with the web service frontend 210, the user 122 can review and interact with one or more recommended connections. Further still, the web service frontend 210 may be configured to interact with one or more of the other modules 212-220, such as the candidate presentation module 214, in presenting one or more of the recommended connections to the user 122.

The candidate retrieval module 212 is configured to retrieve one or more member profiles corresponding to recommended connections for the user 122. In one embodiment, the candidate retrieval module 212 retrieves a predetermined number of member profiles based on the connections recommended to the user 122. For example, where there 10 connections recommended to the user 122, the candidate retrieval module 212 may retrieve the member profiles corresponding to the 10 recommended connections. Additionally, and/or alternatively, the candidate retrieval module 212 may retrieve those member profiles corresponding to a selected subset of the connections recommended to the user 122. For example, the candidate retrieval module 212 may retrieve a most recent set of member profiles, such as 10 member profiles, selected from a group of 20 recommended connections. The retrieved member profiles may be stored as the candidates 222.

The candidates 222 represent an initial set of recommended connections for the user 122. However, the selection process for those candidates 222 may have been focused on the short-term reward to the user 122 rather than a long-term reward or the number of potential future interactions with the user 122. Accordingly, to account for the potential interactions with the user 122, the candidate retrieval module 212 may also retrieve a predetermined number of prior interaction(s) with other recommended candidates. The candidate retrieval module 212 may retrieve these interaction(s) from the member activity database 116 and store these interaction(s) as the interaction(s) 224. As discussed below, the online connection server 112 leverages the machine-learning module 218 and the selected candidates 222 to determine which of the candidates 222 are more likely to have a better long-term reward (e.g., more interactions with the user 122), and then reorders the selected candidates 222 so as to present those candidates 222 to the user 122 that are likely to have the better, long-term reward. The reordered candidates may be stored as the reordered candidate(s) 230. In addition, through the execution of the machine-learning module 218, the online connection server 112 builds and/or trains a machine-learning model 232.

To determine the reordered candidate(s) 230, the online connection server 112 models the user's 122 interactions with other recommended connections as a Markov Decision Process (MDP). In one embodiment, the MDP includes four parameters: a state S, an action (or candidate) A, a reward R, a transition probability P, and a discount factor $\gamma$. The state $s_t \in S$ captures the user's 122 member profile and one or more of the member profile preferences and/or attributes. To generate a state from a given member profile, the online connection server 112 may implement the state representation module 216. Implementation details of the state representation module 216 is further discussed with reference to FIG. 4.

An action $a_t \in A$ corresponds to a recommended candidate for the user 122 based on the current state $s_t$. When the recommended candidate $a_t$ is presented to the user 122 (e.g., via the candidate presentation module 214), the user 122 may perform an interaction with the recommended candidate $a_t$. An interaction may be a message to the recommended candidate, an invitation to connect with the recommended candidate, a viewing of a member profile corresponding to the recommended candidate, or any other type of interaction or combination thereof. The interaction may also include a non-interaction with the recommended candidate, such as ignoring or dismissal of the recommended candidate. Accordingly, in some instances, the action $a_t$ may also refer to the interaction that the user 122 performs relative to a recommended candidate. A reward $r_t \in R$ is assigned based on the interaction, or lack thereof, with the recommended candidate. The reward $r_t$ may be a positive value (e.g., "1" or more) where the interaction is classified as positive (e.g., an invitation to establish a connection) and may be a negative or zero value where the interaction is classified as negative (e.g., a dismissal of the connection or ignoring the recommended connection).

After an interaction with the recommended candidate $a_t$ that corresponds to the state $s_t$ is performed, the online connection server 112 determines a transition probability $p(s_t|s_t, a_t)$ that models a state transition probability from $s_t$ to $s_{t+1}$. The online connection server 112 also determines the discount factor $\gamma \in [0, 1]$, which represents a discount of a present value of a future reward. In one embodiment, when $\gamma=0$, an immediate (e.g., short-term) reward is emphasized and when $\gamma=1$, all future rewards will be treated just as emphasized as the short-term reward. With this framework in mind, the online connection server 112 is configured to determine a recommendation policy that observes a current state $s_t$ and generates a recommended candidate $a_t$ that maximizes an expected discount sum of all future rewards, which may be represented as $$E\left[\sum_{k=0}^{\infty} \gamma^k r_{t+k}\right].$$

In determining this recommendation policy, the online connection server 112 may implement the machine-learning module 218, which may be implemented as a deep Q-network (DQN). As an off-policy implementation, the DQN may train on historical interaction data (e.g., the one or more interactions(s) 224) by using Bellman's equation. As discussed above, the future return is modeled as an action-value function Q(s, a). An optimal state-value function Q*(s, a) should also satisfy the Bellman equation, $Q^*(s, a)=E[r+\gamma \arg\max_{\tilde{a}} Q^*(\tilde{s}, \tilde{a})]$. Due to the potential scale of the state and action space, a deep neural network may be used to approximate the Q function, which may be referred to as a Q-network. The Q-network is trained to minimize the temporal difference between the current optimal Q-value estimation and the target. The loss function may be written as follows:

$$L(\theta) = E_{(s,a,r,\tilde{s}) \sim R}\left[\left(r + \gamma \, \underset{\tilde{a}}{\mathrm{argmax}} \, Q(\tilde{s}, \tilde{a}; \theta^-) - Q(s, a; \theta)\right)^2\right]$$

To stabilize the training, the online connection server 116 may implement a replay buffer 234, which may be labeled as R. The replay buffer 234 may store a predetermined number of transitions (e.g., transition(s) 228), from old policies and, in one embodiment, for each optimization step, a predetermined number of transition(s) 228 are sampled from the replay buffer 234 and are used to optimize the parameters of the neural network (e.g., the machine-learning module 218).

In addition, samples with a higher previous training losses may be sampled with a higher weight to increase the speed at which the training is performed. Furthermore, additional stabilization of the training may be performed by soft-updating the target network parameterized by $\theta^-$. The online connection server 112 may implement an update module 220 to perform the soft-updating, which may be represented as $\theta^- \leftarrow (1-\tau)\theta^- + \tau\theta$.

The machine-learning module 218 may be implemented according to one or more machine-learning algorithms. Furthermore, through iterations of the machine-learning module 218, the machine-learning module 218 constructs and/or trains the machine-learning model 232. Pseudo-code for one example algorithm implemented by the machine-learning module 218 is reproduced below as Algorithm 1:

| Algorithm 1 |
|---|
| init: Randomly initialize DQN value network Q(s, a|θ) with parameters θ. Initialize the target network with the weight $\theta^- \leftarrow \theta$. Initialize the replay buffer R. |
| 1    for session i = 1 to M do |
| 2      Query viewing member's embedding $v_i$, the viewing member's last five sent invitations' embeddings $[d_0, d_1, d_2, d_3, d_4]$ and candidate list cand_list = $[c_0, c_1, \ldots]$ from member activity database 116. |
| 3      State $s_i$ = SRM($[v_i, d_0, d_1, d_2, d_3, d_4]$) |
| 4      From cand_list, find the optimal candidate to recommend $a_i = \underset{a' \in cand\_list}{\mathrm{argmax}} \, Q(s_i, a')$ with $\epsilon$-greedy exploration. |
| 5      Observe the reward $r_i$ and the next state $s_i'$ based on the offline logs (e.g., transactions and/or activities stored in the member activity database 116). |
| 6      Store the transition $(s_i, a_i, r_i, s_i')$ in the replay buffer R. |
| 7      Sample a batch of N samples $(s_j, a_j, r_j, s_j')$ from the replay buffer R with prioritized experience replay. |

-continued

Algorithm 1

8  Update the DQN (e.g., via the update module 220) by minimizing $$\mathcal{L}(\theta) = \frac{1}{N} \sum_j \left[ \left( r_j + \gamma \max_{a'} Q(s'_j, a'; \theta^-) - Q(s_j, a_j; \theta) \right)^2 \right]$$

9  Update the target network (e.g., via the update module 220):
   $\theta^- \leftarrow (1-\tau)\theta^- + \tau\theta$.

One of the challenges in implementing the disclosed machine-learning module 218, is that the state(s) 226 and actions in the problem are not trivial to define. To both capture the viewing member's dynamic preference and decrease the difficulty of training the machine-learning module 218, the input to the machine-learning module 218 is formulated to be graph-based embeddings of the viewing member's profile and his/her last-five sent invitation. The viewing member's profile and/or the prior interactions (e.g., the last-five sent invitations) may be converted to a graph-based embedding using one or more embedding techniques, such as DeepWalk, node2vec, graph2vec, or other such embedding techniques now known or later developed.

The state representation module 216, which may be configured to model both the individual and interactive features between the viewers and the destinations, is used to infer the state of the environment. An action may be considered as a continuous vector with the same length as the graph-based embedding and may be viewed as one candidate to recommend. to the viewing member.

The candidates 222 are then re-ranked and/or re-ordered based on their cosine similarities to the action and may be stored as the re-ordered candidate(s) 230. The candidate presentation module 214 may then present the re-ordered candidate(s) 230 to the viewing member, via the candidate presentation module 214, based on their pairwise similarity score. Accordingly, a candidate from the candidates 222 that is more similar to the action embedding will be ranked higher.

A further challenge in implementing the disclosed machine-learning module 218 and training the machine-learning model 232 is defining the reward function based on the states. In one embodiment, the reward is modeled based on the feedback by the viewing member. As mentioned above, a non-positive reward (e.g., "0") may be assigned if the recommendation is ignored or otherwise negatively acted on, and a positive reward may be assigned (e.g., "1" or more) when the viewing member interacts with the presented, recommended connection. In one embodiment, inviting the recommended connection to connect with the viewing member is regarded as a positive interaction with the recommended connection.

Predetermined time periods may be established for the various interactions, and such predetermined time periods may result in the assignment of a reward value. For example, any interaction that happens between the viewing member and the destination (e.g., the recommended connection) within 28 days may result in the assignment of a reward based on the raw number of interactions. In this context, and as mentioned above, a value of 28 days may be considered a short-term reward while longer predetermined time periods, such as 6 months, may be considered a long-term reward. Therefore, while the 'short-term' reward may be input as a signal to the machine-learning module 218, the machine-learning module 218 is configured to estimate a 'long-term' reward based on those signals.

Yet another challenge with the disclosed machine-learning module 218 is the continuous action space. It can be challenging to implement a deep Q-network (DQN) or stochastic policy gradient because the entirety of the action space may be, at times, impractical to search. To overcome these challenges, the machine-learning module 218 may further be implemented as a deep deterministic policy gradient (DDPG), which uses an additional neural network beside the Q-function network to approximate the policy. This particular implementation improves the optimization under the continuous action setting. However, as the convergence of two neural networks is challenging, the machine-learning module 218 may be modified, such as target network and prioritized experience replay, to both stabilize and speed up the model training.

Figure 3:
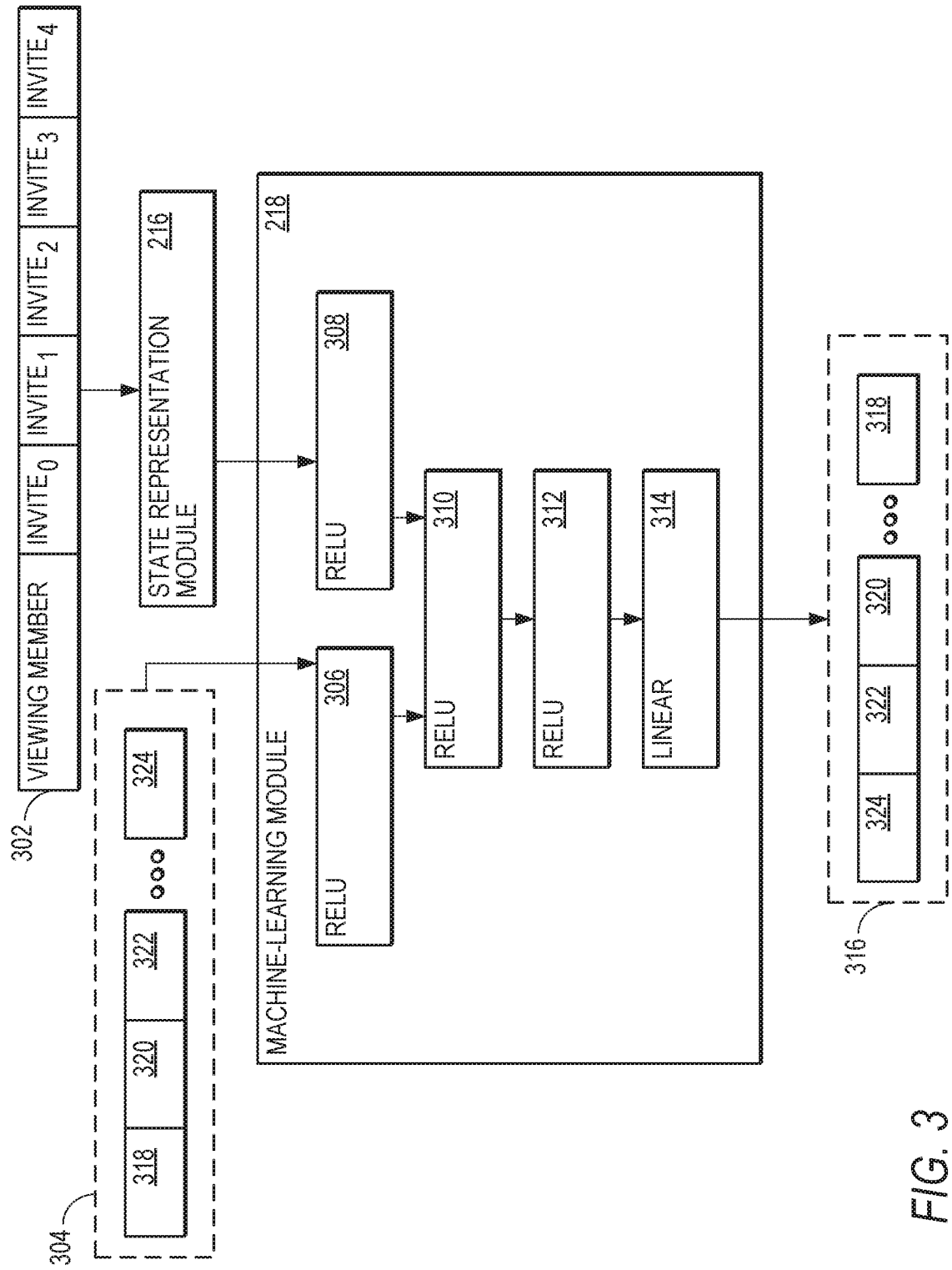
FIG. 3 illustrates an example of the machine-learning module of the online connection server of FIG. 1, according to an example embodiment.

FIG. 3 illustrates an example of the machine-learning module of the online connection server of FIG. 1, according to an example embodiment. As shown in FIG. 3, a candidate list 304 is input to the machine-learning module 218. The candidate list 304 includes an initial set of recommended connections 318-324, e.g., recommended candidates. The recommended candidates may be stored as the candidates 222 and determined as previously described.

In addition to the candidate list 304, machine-learning module 218 receives a state s from the state representation module 216. As input, the state representation module 216 receives a set 302 of embeddings, which may include the viewing member's profile as an embedding, and the last five interactions (as embeddings) with other member profiles or connections in the online connection network. In one embodiment, the last five interactions are prior invitations to establish a connection with the viewing member's profile. Furthermore, while the interactions include the last five interactions, any other predetermined number of prior interactions may be included in the set 302 of embeddings.

Using the candidate list 304 and the set 302 of embeddings, the machine-learning module 218 inputs these parameters into corresponding rectified linear units 306-312. The output of the rectified linear units 306-312 is provided as input to a linear function 314, which may be represented as Q(s, a). The output from the machine-learning module 218 includes, but is not limited to, a second candidate list 316, where each candidate 318-324 is associated with a corresponding Q-value as determined by the machine-learning module 218, and a machine-learning model 232 and/or refinements of the machine-learning model 232. The second candidate list 316 may then be re-ordered or re-ranked according to the Q-value associated with a corresponding candidate. The output from the machine-learning module 218 may be stored as the reordered candidate(s) 230.

Figure 4:
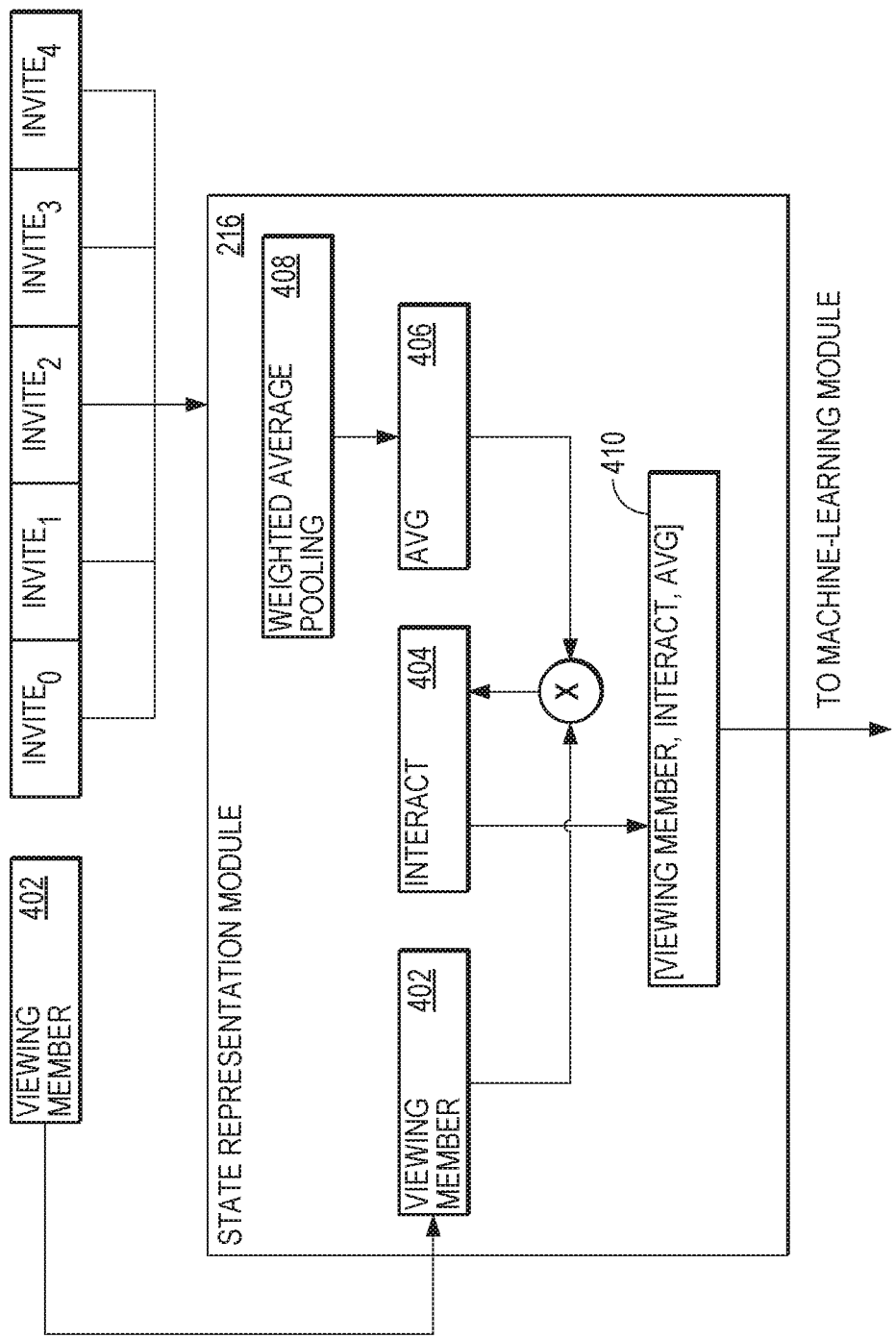
FIG. 4 illustrates an example of the state representation module of the online connection server of FIG. 1, according to an example embodiment.

FIG. 4 illustrates an example of the state representation module 216 of the online connection server of FIG. 1, according to an example embodiment. The state representation module 216 accepts as input an embedding of the viewing member profile 402 and a plurality of prior interactions by the viewing member (e.g., the prior five invitations sent by the viewing member). The prior interactions are input to a weighted average pooling function 408, the output of which is then input to an averaging function 406. The cross-product of the embedding of the viewing member profile 402, an interaction 404, and the output averaging function 406 is then determined and stored as state 410. The state s is then output by the state representation module 216.

Figure 5:
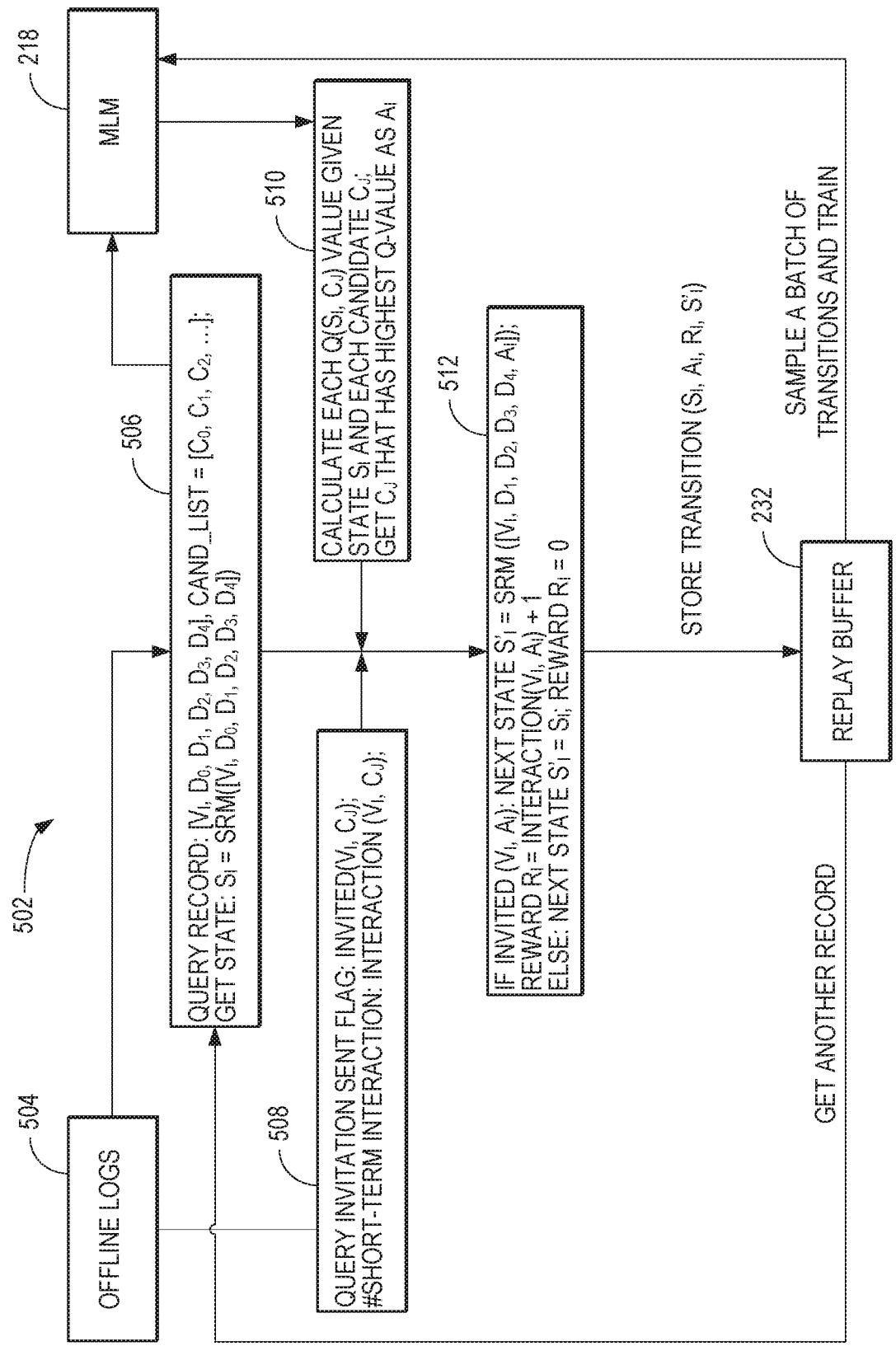
FIG. 5 illustrates an example of a process flow for training a machine-learning model that more accurately selects recommended connections, according to an example embodiment.

FIG. 5 illustrates an example of a process flow 502 for training the machine-learning model 232 that more accurately selects recommended connections, according to an example embodiment. FIG. 5 references offline logs 504, which may be obtained from one or more of the databases 116-120 and may include prior interactions by a viewing member with other connections of the online connection network, prior behavior by the viewing member in interacting with the online connection network, and other such activities.

At block 506, the online connection server 112 performs various initial operations, such as obtaining a graph embedding of the viewing member profile $v_i$, obtaining the prior interactions with other members of the online connection network $d_0$-$d_4$, obtaining the initially recommended set of candidates 222, and determining the state $s_i$ by the state representation module 216. These initial parameter values may then be input to the machine-learning module 218.

At block 510, the machine-learning module 218 determines the $Q(s_i, c_j)$ value for each candidate $c_j$ given a state $s_i$. Thus, each candidate $c_j$ is associated with a particular $Q(s_i, c_j)$ value. The machine-learning module 218 is then instructed to return the candidate $c_j$ that has the highest $Q(s_i, c_j)$ value, and this candidate is then assigned as the Action $a_i$. At block 508, the online connection server 112 also determines whether the viewing member $v_i$ had an interaction with a candidate $c_j$ selected from the set of candidates 222. In particular, the online connection server 112 may determine whether the viewing member $v_i$ requested that the action $a_i$ establish a connection with the viewing member (e.g., represented by the function INVITED($v_i$, $c_j$)). The INVITED function may perform by querying the member activity database 116 for interactions between the viewing member $v_i$ and the action $a_i$.

At block 512, the online connection server 112 determines the value of the reward to assign to reward $r_i$. Where the online connection server 112 determines that the viewing member $v_i$ invited the action $a_i$ to establish a connection, the online connection server 112 performs two operations: 1) the online connection server 112 assigns the next state $s_i'$ of the viewing member $v_i$ as the state representation of $[v_i, d_1, d_2, d_3, d_4, a_i]$; and 2) the online connection server 112 assigns the reward $r_i$ based on whether the viewing member $v_i$ had a short-term interaction with the action $a_i$ plus a predetermined amount (e.g., a value of "1"). The action $a_i$ is included in the set for determining the state representation because action $a_i$ may be represented as a graph-based embedding and, therefore, may include information about interactions between the recommended candidate represented by $a_i$ and the viewing member $v_i$.

Alternatively, where the online connection server 112 determines that the viewing member $v_i$ has not invited, or has failed to invite, the action $a_i$ to establish a connection, the online connection server 112 performs two other operations: 1) the online connection server 112 assigns the next state $s_i'$ of the viewing member $v_i$ as the current state $s_i$; and 2) the online connection server 112 then assigns a value of "0" to the reward $r_i$.

The online connection server 112 then generates a transition that includes ($s_i$, $a_i$, $r_i$, and $s_i'$). The online connection server 112 then stores this transition in the replay buffer 234, and the process flow returns to block 506, where the online connection server may then process another viewing member $v_{i+1}$ or another set of candidates for the viewing member $v_i$.

In addition, at predetermined intervals (e.g., once a day, every 10th transition, etc.), the online connection server 112 trains the machine-learning module 218 using a predetermined number of transitions stored in the replay buffer 234. For example, the online connection server 112 may randomly sample 10 transitions from the replay buffer 234 and input these transitions to the machine-learning module 218 to further develop the Q-network.

Figure 6A:
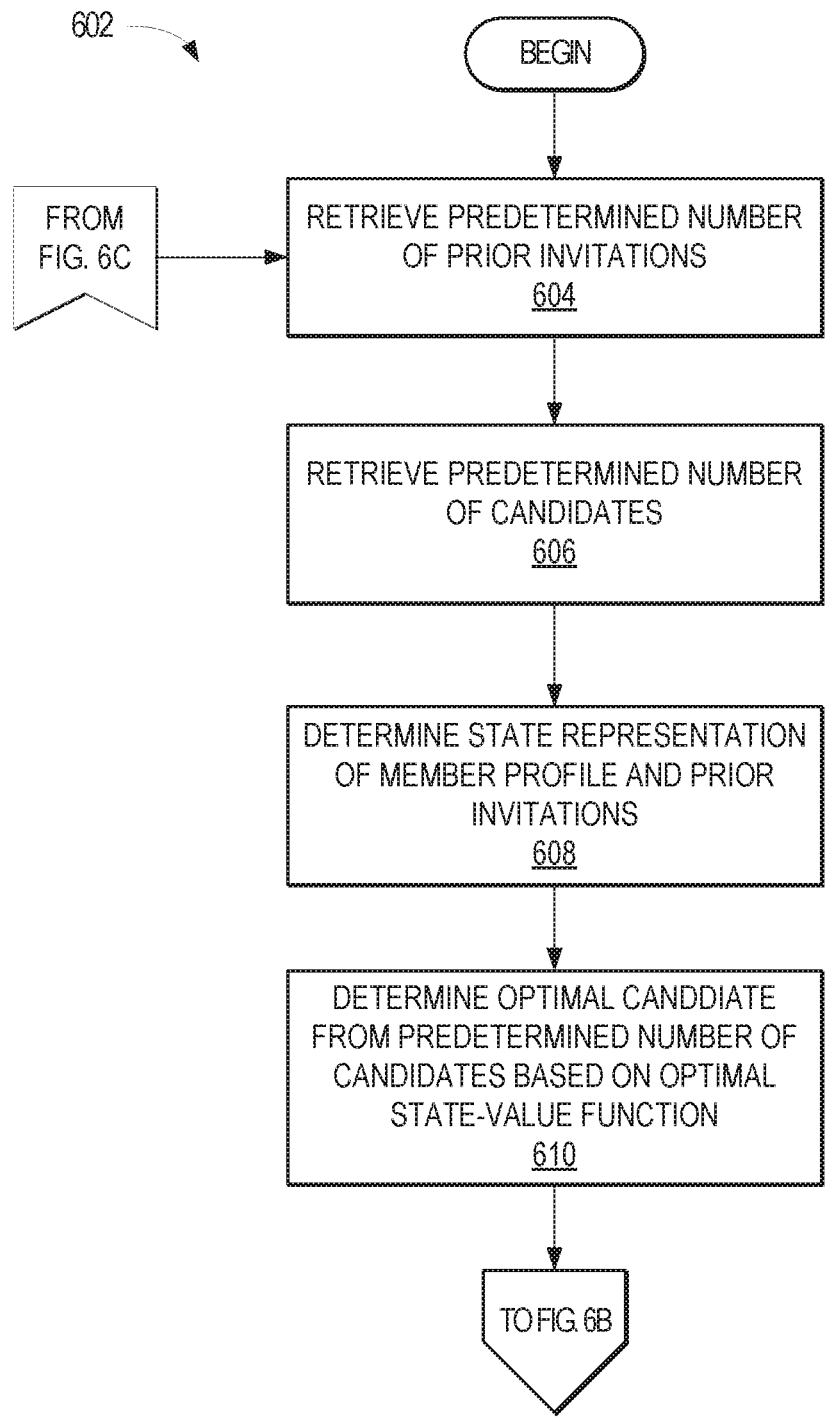
FIGS. 6A-6C illustrate a method, in accordance with an example embodiment, for more accurately determining recommend connections using a deep Q-learning machine-learning model.
Figure 6B:
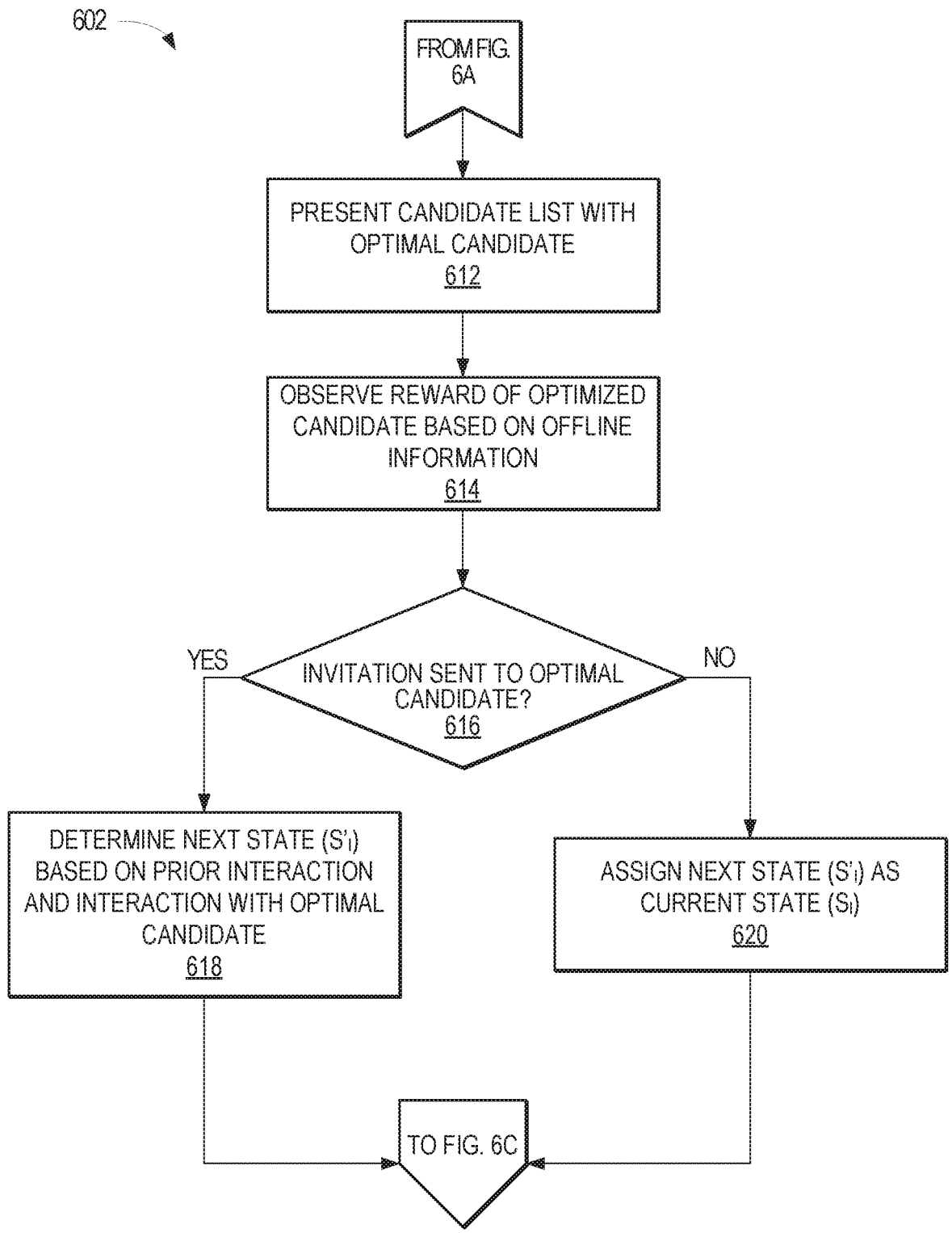
Figure 6C:
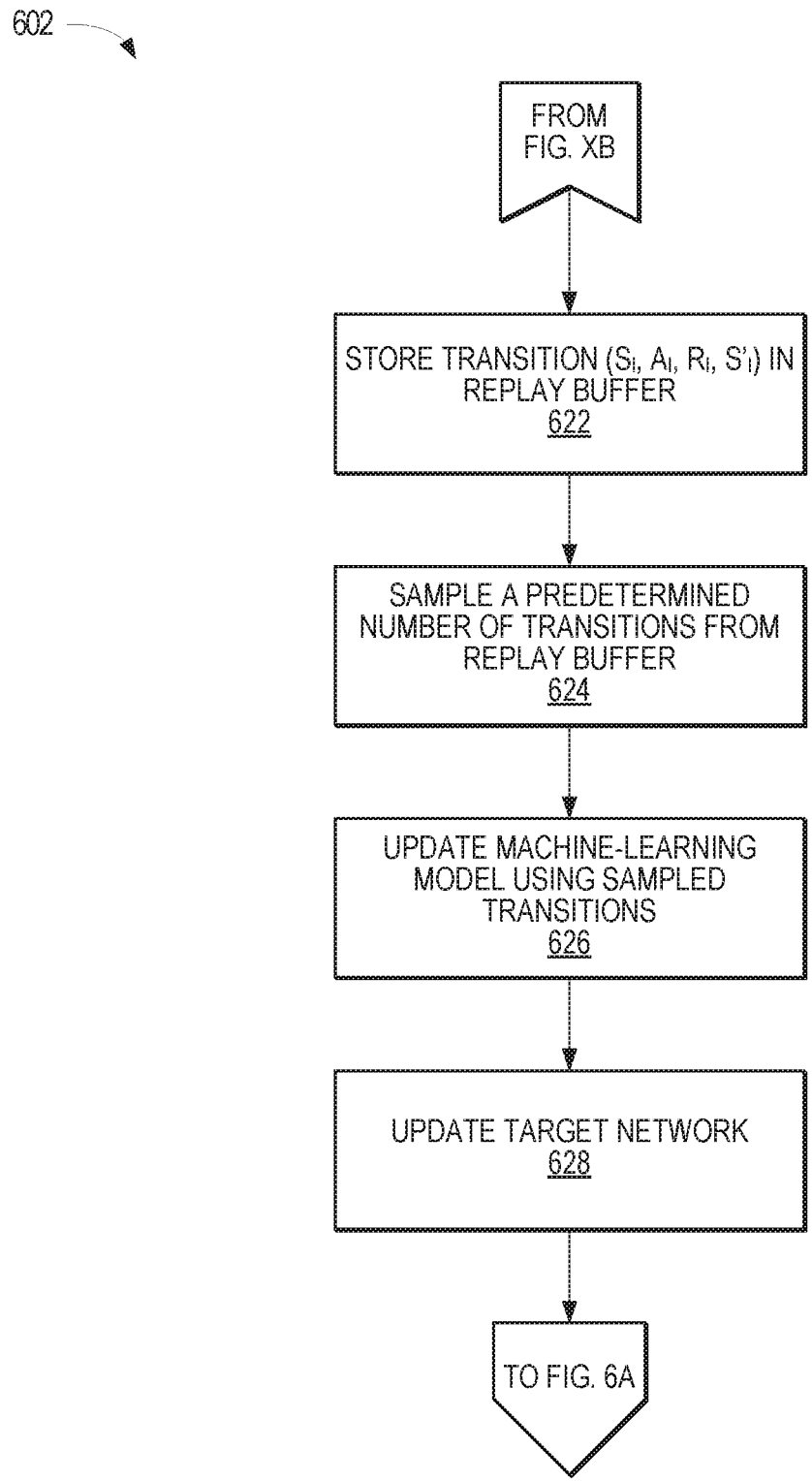

FIGS. 6A-6C illustrate a method 602, in accordance with an example embodiment, for more accurately determining recommend connections using a deep Q-learning machine-learning model. The method 602 may be implemented by one or more of the components illustrated in FIG. 2, and is discussed by way of reference thereto.

Initially, and with reference to FIG. 6A, the online connection server 112 retrieves or obtains a predetermined number of prior interaction(s) 224 by a viewing member with other connections of an online connection network (Operation 604). The online connection server 112 may obtain such information from the member activity database 116. The online connection server 112 may then obtain or retrieve a predetermined number of recommended connections for the viewing member profile (Operation 606). The predetermined number of recommended connections may be stored as candidate(s) 222 and retrieved or obtained from one or more of the databases 116-120. The online connection server 112 then determines a state representation of the viewing member profile and the prior interaction(s) 224 using the state representation module 216, which was discussed with reference to FIG. 4 (Operation 608).

The online connection server 112 next instructs the machine-learning module 218 to determine an optimal candidate from the predetermined number of recommended connections (e.g., selected from the candidates 222) (Operation 610). In one embodiment, the machine-learning module 218 determines the optimal candidate based on Algorithm 1 explained above. For example, the machine-learning module 218 may determine a $Q(v_i, c_j)$ value for each of the recommended connections. The machine-learning module 218 may then reorder or re-rank the candidates 222 according to the determined $Q(v_i, c_j)$ value associated with each candidate. The re-ordered or re-ranked candidates may be stored as the reordered candidates 230.

Referring to FIG. 6B, the reordered candidates may be presented to the user via the candidate presentation module 214, which may cause a display of a graphical user interface that presents the re-ordered candidates 230 as recommended connections and allows the viewing member to interact with one or more of the recommended connections (Operation 612). The online connection server 112, via the web service frontend 210 or machine-learning module 218 then waits and observes whether the viewing member interacts with one or more of the presented, recommended connections, such as the optimal candidate (e.g., action $a_i$ of FIG. 5) (Operation 614). In one embodiment, the machine-learning module 218 may periodically review and/or scan the offline logs of the online connection server 112, such as the member activity database 116, to determine whether the viewing member has interacted with the optimal candidate. For example, the machine-learning module 218 may determine whether the viewing member has sent an invitation to the optimal member to establish a connection with the viewing member (Operation 616).

Where the online connection server 112 determines that the viewing member invited the optimal candidate to establish a connection (e.g., the "YES" branch of Operation 616), the method proceeds to Operation 618, where the online connection server 112 performs two operations discussed above with reference to FIG. 5: 1) the online connection server 112 assigns the next state $s_i$ of the viewing member $v$; as the state representation of $[v_i, d_1, d_2, d_3, d_4, a_i]$; and 2) the online connection server 112 assigns the reward $r_i$ based on whether the viewing member $v_i$ had a short-term interaction with the action $a_i$ plus a predetermined amount (e.g., a value of "1").

Alternatively, where the online connection server 112 determines that the viewing member $v_i$ has not invited, or has failed to invite, the action $a_i$ to establish a connection (e.g., the "NO" branch of Operation 616), the method 602 proceeds to Operation 620. At Operation 620, the online connection server 112 performs two other operations as explained with reference to FIG. 5: 1) the online connection server 112 assigns the next state $s_i'$ of the viewing member $v_i$ as the current state $s_i$; and 2) the online connection server 112 then assigns a value of "0" to the reward $r_i$.

Referring next to FIG. 6C, the online connection server 112 then generates a transition that includes ($s_i$, $a_i$, $r_i$, and $s_i'$), and stores this transition in the replay buffer 234 (Operation 622). The online connection server 112 and/or the machine-learning module 218 may then sample a predetermined number of transitions from the replay buffer 234 (Operation 624), and then update and/or re-train the machine-learning model 232 (Operation 626). The machine-learning module 218 then updates the target network according to the equation $\theta^- \leftarrow (1-\tau)\theta^- + \tau\theta$ (Operation 628). The method 602 may then return to Operation 604 to process another set of invitations for the viewing member, or process another set of invitations for another viewing member.

In this manner, the disclosed systems and methods implement machine-learning solution for improving recommended connections for a viewing member of an online connection server. The solutions and implementations disclosed herein improve the field of computer science and data analytics because the disclosed solutions and implementations lead to more accurate results and determining connections for members of an online connection network that are likely to lead to improved relationships and higher rewards (e.g., more interactions, more communications, etc.). Furthermore, because the disclosed implementation leverages a state-based sequential model (e.g., a Markov Decision Process), the processes and methodologies can be scaled to handle a much larger sample set of member data than other implementations. Finally, as the disclosed implementation uses a deep actor-critic network, the disclosed implementation achieves a faster convergence and, thus, the online connection server 112 achieves more accurate predictions in lesser time.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-6C are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-Readable Medium

Figure 7:
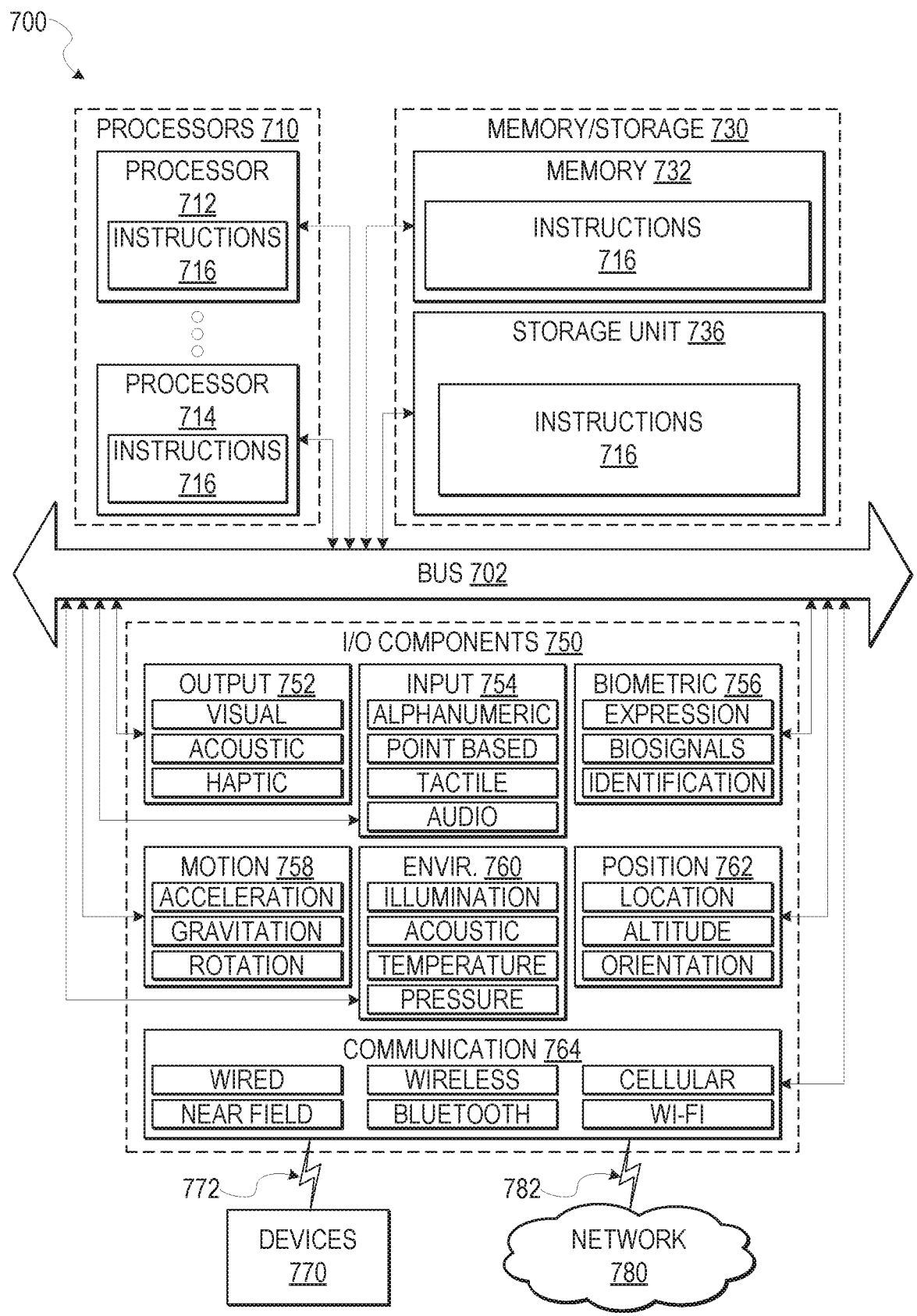
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions may cause the machine to execute the flow diagrams of FIGS. 5-6C. Additionally, or alternatively, the instructions may implement one or more of the components of FIG. 1-4. The instructions transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), or any machine capable of executing the instructions 716, sequentially or otherwise, that specify actions to be taken by machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 712 and processor 714 that may execute instructions 716. The term "processor" is intended to include multi-core processor that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core process), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of processors 710 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772 respectively. For example, the communication components 764 may include a network interface component or other suitable device to interface with the network 780. In further examples, communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF413, Ultra Code, UCC RSS-2D bar code, and other optical codes), or acoustic detection components (e.g., microphones to identify tagged audio signals). In addition, a variety of information may be derived via the communication components 764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
a machine-readable medium storing computer-executable instructions; and
at least one hardware processor communicatively coupled to the machine-readable medium that, when the computer-executable instructions are executed, configures the system to perform a plurality of operations comprising:
obtaining a machine-learning model by training a machine-learning program using reinforcement learning to maximize a reward, the reinforcement learning comprising a state based on member profile, the reward being based on interactions of members after receiving connection recommendations, the machine-learning program being trained with data comprising member profiles and interactions of members;
obtaining a first plurality of recommended candidate members for connecting with a first member of an online connection network;
obtaining a plurality of interactions of the first member with other members of the online connection network;
determining, by a state representation module, a first state representation based on a first member profile of the first member and the plurality of interactions, wherein the first state representation is determined based on an embedding corresponding with the first member profile and an embedding for each interaction of the plurality of interactions;
determining, by the machine-learning model, a second plurality of recommended candidate members based on an input to the machine-learning model comprising the first state representation and the first plurality of recommended candidate members;
wherein the second plurality of recommended candidate members comprises a different ranking of recommended candidate members than the first plurality of recommended candidate members; and
causing a presentation of the second plurality of recommended candidate members to the first member.

2. The system of claim 1, wherein the first state representation is derived with the state representation module by applying an averaging function to a result of a weighted average pooling function applied to the embeddings for each interaction of the plurality of interactions, before calculating a cross product of a result of the averaging function and the embedding corresponding with the first member profile.

3. The system of claim 1, wherein the plurality of operations further comprises:
subsequent to causing presentation of the second plurality of recommended candidate members to the first member, monitoring for an interaction, by the first member, with a candidate member in the second plurality of recommended candidate members; and
determining, by the state representation module, a second state representation based on the interaction, by the first member, with the candidate member in the second plurality of recommended candidate members.

4. The system of claim 3, wherein the plurality of operations further comprises:
generating a transition based on the first state representation, the candidate member in the second plurality of recommended candidate members, and the second state representation; and storing the transition in a replay buffer comprising a plurality of previously determined transitions, wherein the plurality of previously determined transitions are to be used in further training the machine-learning model.

5. The system of claim 4, wherein obtaining the machine-learning model further comprises:
sampling the interactions of members after receiving connection recommendations; and
training the machine-learning model based on the sampled interactions.

6. The system of claim 1, wherein an interaction selected from the plurality of interactions comprises an invitation to establish a connection between the first member and another member of the online connection network.

7. The system of claim 1, wherein the machine-learning model is based on a deep Q-learning algorithm.

8. A computer-implemented method comprising:
obtaining a machine-learning model by training a machine-learning program using reinforcement learning to maximize a reward, the reinforcement learning comprising a state based on member profile, the reward being based on interactions of members after receiving connection recommendations, the machine-learning program being trained with data comprising member profiles and interactions of members;
obtaining a first plurality of recommended candidate members for connecting with a first member of an online connection network;
obtaining a plurality of interactions of the first member with other members of the online connection network;
determining, by a state representation module, a first state representation based on a first member profile of the first member and the plurality of interactions, wherein the first state representation is determined based on an embedding corresponding with the first member profile and an embedding for each interaction of the plurality of interactions;
determining, by the machine-learning model, a second plurality of recommended candidate members based on an input to the machine-learning model comprising the first state representation and the first plurality of recommended candidate members,
wherein the second plurality of recommended candidate members comprises a different ranking of recommended candidate members than the first plurality of recommended candidate members; and
causing a presentation of the second plurality of recommended candidate members to the first member.

9. The method of claim 8, wherein the first state representation is derived with the state representation module by applying an averaging function to a result of a weighted average pooling function applied to the embeddings for each interaction of the plurality of interactions, before calculating a cross product of a result of the averaging function and the embedding corresponding with the first member profile.

10. The method of claim 8, further comprising:
subsequent to causing presentation of the second plurality of recommended candidate members to the first member, monitoring for an interaction, by the first member, with a candidate member in the second plurality of recommended candidate members; and
determining, by the state representation module, a second state representation based on the interaction, by the first member, with the candidate member in the second plurality of candidate members.

11. The method of claim 10, further comprising:
generating a transition based on the first state representation, the candidate member in the second plurality of recommended candidate members, and the second state representation; and
storing the transition in a replay buffer comprising a plurality of previously determined transitions, wherein the plurality of previously determined transitions are to be used in further training the machine-learning model.

12. The method of claim 11, wherein obtaining the machine-learning model further comprises:
sampling the interactions of members after receiving connection recommendations; and
training the machine-learning model based on the sampled interactions.

13. The method of claim 8, wherein an interaction selected from the plurality of interactions comprises an invitation to establish a connection between the first member and another member of the online connection network.

14. The method of claim 8, wherein the machine-learning model is based on a deep Q-learning algorithm.

15. A computer storage device having computer-executable instructions stored thereon that, when executed by one or more processors, cause a system to perform a plurality of operations comprising:
obtaining a machine-learning model by training a machine-learning program using reinforcement learning to maximize a reward, the reinforcement learning comprising a state based on member profile, the reward being based on interactions of members after receiving connection recommendations, the machine-learning program being trained with data comprising member profiles and interactions of members;
obtaining a first plurality of recommended candidate members for connecting with a first member of an online connection network;
obtaining a plurality of interactions of the first member with other members of the online connection network;
determining, by a state representation module, a first state representation based on a first member profile of the first member and the plurality of interactions, wherein the first state representation is determined based on an embedding corresponding with the first member profile and an embedding for each interaction of the plurality of interactions;
determining, by the machine-learning model, a second plurality of recommended candidate members based on an input to the machine-learning model comprising the first state representation and the first plurality of recommended candidate members, wherein the second plurality of recommended candidate members comprises a different ranking of recommended candidate members than the first plurality of recommended candidate members; and
causing a presentation of the second plurality of recommended candidate members to the first member.

16. The computer storage device of claim 15, wherein the first state representation is derived with the state representation module by applying an averaging function to a result of a weighted average pooling function applied to the embeddings for each interaction of the plurality of interactions, before calculating a cross product of a result of the averaging function and the embedding corresponding with the first member profile.

17. The computer storage device of claim 15, wherein the plurality of operations further comprises:
subsequent to causing presentation of the second plurality of recommended candidate members to the first member, monitoring for an interaction, by the first member, with a candidate member in the second plurality of recommended candidate members; and determining, by the state representation module, a second state representation based on the interaction with candidate members in the second plurality of candidate members.

18. The computer storage device of claim 17, wherein the plurality of operations further comprises:

generating a transition based on the first state representation, the candidate member in the second plurality of recommended candidate members, and the second state representation; and storing the transition in a replay buffer comprising a plurality of previously determined transitions, wherein the plurality of previously determined transitions are to be used in further training the machine-learning model.

19. The computer storage device of claim 18, wherein obtaining the machine-learning model further comprises:

sampling the interactions of members after receiving connection recommendations; and training the machine-learning model based on the sampled interactions.

20. The computer storage device of claim 15, wherein an interaction selected from the plurality of interactions comprises an invitation to establish a connection between the first member and another member of the online connection network.

* * * * *